(12) United States Patent
Dias Duarte et al.

(10) Patent No.: US 12,032,407 B2
(45) Date of Patent: Jul. 9, 2024

(54) DEVICE WITH FOLDABLE DISPLAYS

(71) Applicant: Lenovo (United States) Inc., Morrisville, NC (US)

(72) Inventors: Carlos Eduardo Dias Duarte, Indaiatuba (BR); Denis Leite Gomes, Campinas (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/709,302

(22) Filed: Mar. 30, 2022

(65) Prior Publication Data
US 2023/0315153 A1   Oct. 5, 2023

(51) Int. Cl.
*G06F 1/16* (2006.01)

(52) U.S. Cl.
CPC .......... *G06F 1/1641* (2013.01); *G06F 1/1647* (2013.01); *G06F 1/1681* (2013.01); *G06F 1/1616* (2013.01); *G06F 1/162* (2013.01); *G06F 1/1622* (2013.01); *G06F 1/1677* (2013.01); *G06F 1/1686* (2013.01); *G06F 1/1688* (2013.01)

(58) Field of Classification Search
CPC .... G06F 1/1641; G06F 1/1647; G06F 1/1649; G06F 1/162; G06F 1/1622; G06F 1/1677; G06F 1/1681; G06F 1/1652; G06F 1/1616
See application file for complete search history.

(56) References Cited

U.S. PATENT DOCUMENTS

| | | | | |
|---|---|---|---|---|
| 5,949,643 A * | 9/1999 | Batio | ................... | G06F 1/1666 361/679.07 |
| 6,081,207 A * | 6/2000 | Batio | ..................... | G06F 1/166 341/20 |
| 6,302,612 B1 * | 10/2001 | Fowler | .................. | G06F 1/1683 16/224 |
| 7,633,744 B2 * | 12/2009 | Kuhn | .................... | G06F 1/1622 361/679.04 |
| 7,808,549 B2 * | 10/2010 | Kanai | ................... | G06F 1/1641 348/374 |
| 8,018,715 B2 * | 9/2011 | Chang | ................... | G06F 1/1647 361/679.04 |
| 8,539,705 B2 * | 9/2013 | Bullister | ............... | G06F 1/1615 361/679.04 |
| 8,854,278 B2 * | 10/2014 | Parker | .................. | G06F 3/1431 348/794 |
| 10,082,832 B1 * | 9/2018 | Wang | ..................... | G06F 1/1681 |
| 10,168,739 B1 * | 1/2019 | Chen | ..................... | G06F 1/1616 |
| 10,264,186 B2 * | 4/2019 | Lei | ......................... | H04N 23/63 |
| 10,678,305 B1 * | 6/2020 | Lee | ........................ | G06F 1/1681 |
| 10,909,889 B2 * | 2/2021 | Lee | ........................ | G09F 9/301 |
| 10,976,779 B1 * | 4/2021 | Tsai | ...................... | G06F 1/1615 |
| 11,042,191 B2 * | 6/2021 | Kaya | ..................... | G06F 1/1647 |

(Continued)

FOREIGN PATENT DOCUMENTS

CN        206920986 U      1/2018

*Primary Examiner* — Nidhi Thaker
(74) *Attorney, Agent, or Firm* — Brian J. Pangrle

(57) ABSTRACT

A device can include a processor; memory accessible to the processor; a base housing; a first foldable display housing that includes a first foldable display; a first hinge assembly that couples the first foldable display housing to the base housing; a second foldable display housing that includes a second foldable display; and a second hinge assembly that couples the second foldable display housing to the base housing.

16 Claims, 14 Drawing Sheets

(56) References Cited

U.S. PATENT DOCUMENTS

| | | | |
|---|---|---|---|
| 11,122,702 B1* | 9/2021 | Lin | H05K 5/0234 |
| 11,416,024 B2* | 8/2022 | Bryant | G06F 1/1632 |
| 2002/0135535 A1* | 9/2002 | Muller | G06F 1/1649 |
| | | | 345/1.1 |
| 2003/0043087 A1* | 3/2003 | Kim | G06F 1/1641 |
| | | | 345/1.1 |
| 2003/0218577 A1* | 11/2003 | Wang | G06F 1/1671 |
| | | | 345/1.3 |
| 2005/0088463 A1* | 4/2005 | Schilling | G09G 3/20 |
| | | | 345/699 |
| 2005/0253775 A1* | 11/2005 | Stewart | G06F 1/1616 |
| | | | 345/1.1 |
| 2006/0082518 A1* | 4/2006 | Ram | G06F 1/1635 |
| | | | 345/1.1 |
| 2006/0268500 A1* | 11/2006 | Kuhn | G06F 1/1649 |
| | | | 361/679.04 |
| 2008/0024388 A1* | 1/2008 | Bruce | G06F 1/1616 |
| | | | 345/1.1 |
| 2009/0102744 A1* | 4/2009 | Ram | G06F 1/1696 |
| | | | 345/1.1 |
| 2009/0275366 A1* | 11/2009 | Schilling | H04M 1/0247 |
| | | | 455/566 |
| 2012/0223872 A1* | 9/2012 | Ram | G06F 1/1662 |
| | | | 345/1.3 |
| 2015/0062525 A1* | 3/2015 | Hirakata | G06F 1/1641 |
| | | | 349/158 |
| 2015/0212546 A1* | 7/2015 | Ram | G06F 1/1654 |
| | | | 361/679.01 |
| 2016/0124466 A1* | 5/2016 | Ram | G06F 1/1666 |
| | | | 361/679.26 |
| 2016/0320797 A1* | 11/2016 | Ram | G06F 1/1662 |
| 2017/0255232 A1* | 9/2017 | Ram | G06F 1/1649 |
| 2018/0088630 A1* | 3/2018 | Ram | G06F 1/1654 |
| 2018/0275717 A1* | 9/2018 | Ram | G06F 1/1681 |
| 2020/0364021 A1* | 11/2020 | Park | H04N 23/51 |
| 2022/0294886 A1* | 9/2022 | Seo | G09G 3/035 |

\* cited by examiner

DEVICE WITH FOLDABLE DISPLAYS

TECHNICAL FIELD

Subject matter disclosed herein generally relates to display devices including computers and computer displays.

BACKGROUND

A device can include a housing with a display or housings coupled via one or more hinge assemblies where one or more of the housings can include a display.

SUMMARY

A device can include a processor; memory accessible to the processor; a base housing; a first foldable display housing that includes a first foldable display; a first hinge assembly that couples the first foldable display housing to the base housing; a second foldable display housing that includes a second foldable display; and a second hinge assembly that couples the second foldable display housing to the base housing. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
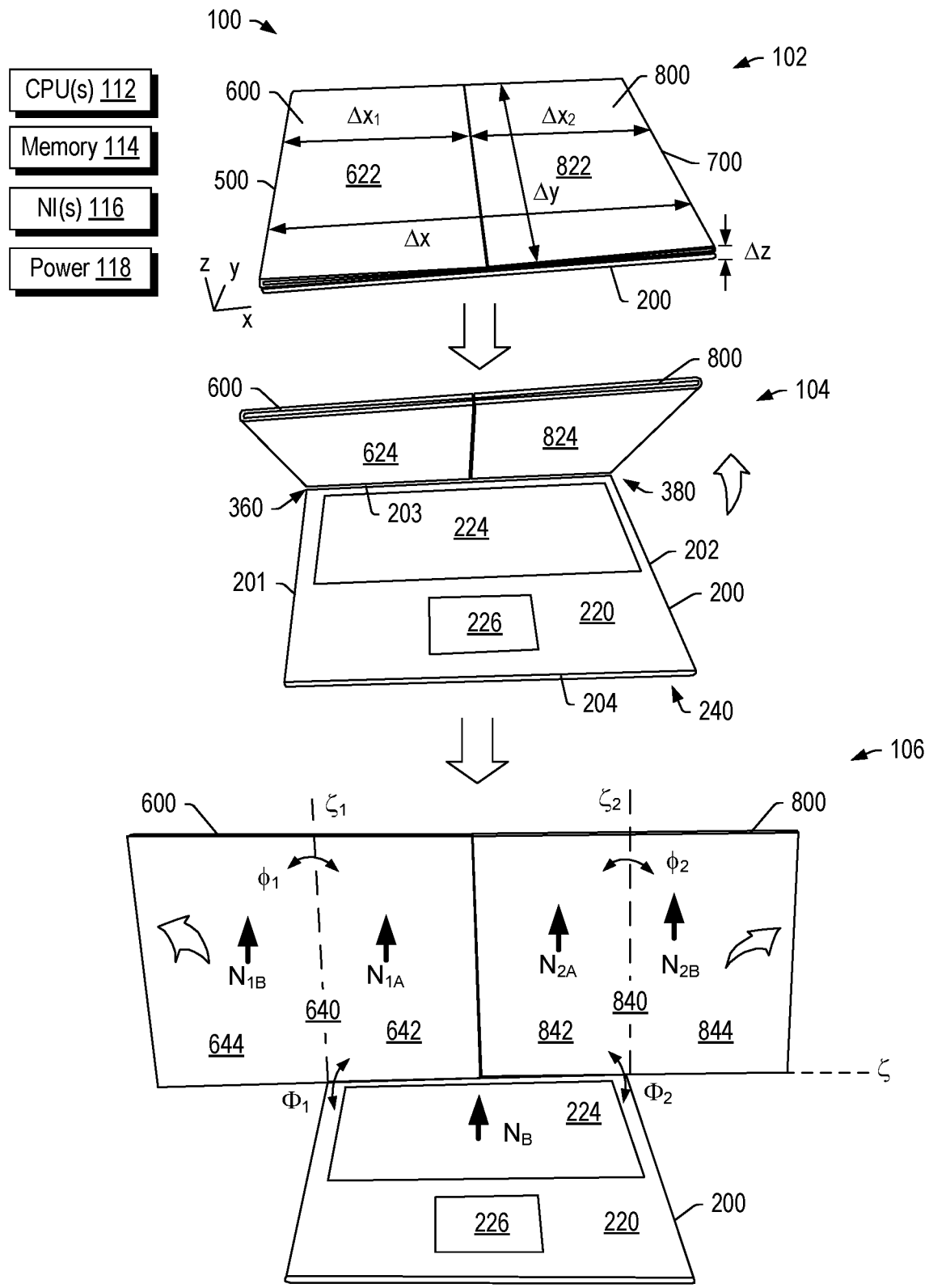
FIG. 1 is a series of views of an example of a device.

FIG. 1 shows an example of a device 100 (e.g., an apparatus) that can include a processor 112 (e.g., one or more processors, one or more cores, etc.), memory 114 accessible to the processor 112, a first foldable display housing 600, a second foldable display housing 800; a base housing 200; a first hinge assembly 360 that couples the foldable display housing 600 to the base housing 200; and a second hinge assembly 380 that couples the foldable display housing 800 to the base housing 200, where in a closed orientation 102, displays 640 and 840 of the foldable display housings 600 and 800 are not in contact with a surface 220 of the base housing 200. In such an example, the displays 640 and 840 are protected in that they do not contact features of the surface 220 of the base housing 200 such as, for example, depressible keys of a keyboard 224. The device 100 can be a computing device, a computing system, etc.

In the example of FIG. 1, the device 100 is shown along with a Cartesian coordinate system with an x coordinate axis (x-axis), a y coordinate axis (y-axis) and a z coordinate axis (z-axis). In the closed orientation 102, the device 100 can be characterized by a footprint or an area that can be defined by a widthwise dimension $\Delta x$, a depthwise dimension $\Delta y$, and a thickness $\Delta z$. A volume of the device 100, V, can be approximated by multiplying $\Delta x$, $\Delta y$ and $\Delta z$. For example, where $\Delta x = 33$ cm, $\Delta y = 22.7$ cm, and $\Delta z = 1.8$ cm, the volume V is approximately 1,348 $cm^3$.

As shown in the example of FIG. 1, the base housing 200 includes opposing side edges 201 and 202, a hinge edge 203 and a front edge 204 along with a back surface 240 and the surface 220 as a top surface. As shown, the foldable display housing 600 includes the display 640 as defining a display surface where the foldable display housing 600 also includes a back surface 622 and a back surface 624 defined in part by a fold axis of the foldable display housing 600, and the foldable display housing 800 includes the display 840 as defining a display surface where the foldable display housing 800 also includes a back surface 822 and a back surface 824 defined in part by a fold axis of the foldable display housing 800. As shown in FIG. 1, the display 640 can include display portions 642 and 644 defined in part by the fold axis of the foldable display housing 600 and the display 840 can include display portions 842 and 844 defined in part by the fold axis of the foldable display housing 800.

In the example of FIG. 1, the foldable display housing 600 can include a hinge assembly 500 and the foldable display housing 800 can include a hinge assembly 700. The hinge assembly 360 can couple to the foldable display housing 600 at a position of the hinge assembly 500 at the fold axis and/or at a position or positions inward from the fold axis and along a portion of the foldable display housing 600 defined by the portions 622 and 642. The hinge assembly 380 can couple to the foldable display housing 800 at a position of the hinge assembly 700 at the fold axis and/or at a position or positions inward from the fold axis and along a portion of the foldable display housing 800 defined by the portions 822 and 842.

In the closed orientation 102, the back surfaces 622 and 822 of the foldable display housings 600 and 800 are outwardly facing to define an outer surface of the device 100 where the back surface 240 of the base housing 200 can also define an outer surface of the device 100.

In FIG. 1, the orientation 104 is an intermediate or transitional orientation of the device 100 where the foldable display housings 600 and 800 are being opened via the hinge assemblies 360 and 380 with respect to the base housing 200, which exposes the features of the top surface 220 of the base housing 200. In the orientation 104, the displays 640 and 840 are still protected as the foldable display housings 600 and 800 are closed (e.g., folded).

In FIG. 1, the orientation 106 is an open planar orientation where each of the foldable display housings 600 and 800 is planar and where the planar foldable display housings 600 and 800 are in a common plane. As shown, the display area of the display 640 can be twice $\Delta x_1$ (e.g., a half-width of the foldable display housing 600) and the display area of the display 840 can be twice $\Delta x_2$ (e.g., a half-width of the foldable display housing 800).

As shown, the hinge assemblies 500 and 700 can define axes $\zeta_1$ and $\zeta_2$ (e.g., fold axes) about which angles $\phi_1$ and $\phi_2$ of the foldable display housings 600 and 800, respectively, may be measured. As shown, the display portions 642, 644, 842 and 844 can be substantially planar where a respective normal (e.g., normal vector) can be defined $N_{1A}$ and $N_{1B}$ and $N_{2A}$ and $N_{2B}$. As an example, the angles $\phi_1$ and $\phi_2$ may be measured using the normals $N_{1A}$ and $N_{1B}$ and $N_{2A}$ and $N_{2B}$. While the orientation 106 is an open planar orientation, the device 100 may be usable with one or more of the foldable display housings 600 and 800 closed or with one of the angles $\phi_1$ and $\phi_2$ less than 180 degrees.

In the example of FIG. 1, the open planar orientation 106 shows the normals $N_{1A}$ and $N_{1B}$ and $N_{2A}$ and $N_{2B}$ as being in a common direction such that a continuous substantially planar display is provided where the angles $\phi_1$ and $\phi_2$ are each approximately 180 degrees (e.g., +/−5 degrees). As explained, one or more of the angles $\phi_1$ and $\phi_2$ may be less than 180 degrees such that a more "surround" experience is provided for a user. For example, consider the normals $N_{1B}$ and $N_{2B}$ being directed substantially at a user's head and, for example, more particularly at a user's eyes. In such an example, the user may have acceptable vision across the displays 640 and 840. Such an orientation may provide a user with a cockpit experience, which may be beneficial for various types of work tasks, process monitoring tasks, simulation tasks, virtual reality tasks, training tasks, gaming tasks, etc.

In the example of FIG. 1, the portion 642 of the display 640 can define an angle $\Phi_1$ with respect to the base housing 200, which may be measured with respect to an axis $\zeta$ and the portion 842 of the display 840 can define an angle $\Phi_2$ with respect to the base housing 200, which may be measured with respect to the axis $\zeta$. As shown, the top surface 220 of the base housing 200 can be substantially planar where a normal (e.g., normal vector) can be defined NB. As shown, the angle $\Phi_1$ and the angle $\Phi_2$ can be measured using the normals $N_{1A}$, $N_{1B}$ and NB (e.g., normal vectors).

In the example of FIG. 1, the device 100 can provide a display area that is greater than an area of the top surface 220 of the base housing 200 while being able to provide a footprint or area in a closed orientation that may be approximately equal to the base housing 200, which may facilitate transport, storage, etc.

As an example, the base housing 200 may be a keyboard housing that includes the keyboard 224 and optionally one or more other features (e.g., a touchpad, a biometric reader, etc.). As an example, the top surface 220 can include the keyboard 224 (e.g., a touch-typing keyboard such as a QWERTY keyboard, etc.) and/or can include one or more touchpads 226.

As an example, a device can include a closed orientation where there is a divide down a center of the device, forming a center seam. In such an example, a user can open the device from the center seam where a first foldable display housing can open to the left and a second foldable display housing can open to the right. As an example, hinge assemblies that operatively couple a base housing and foldable display housing may be friction type of hinge assemblies that can maintain a position of the foldable display housings with respect to the base housing. As an example, one or more foldable display housings may include a stand that can be utilized, for example, to support the device (e.g., for touch-screen touching, etc.). As an example, a stand may extend from a back side of a foldable display housing and may include a stored state and an extended state. As an example, a stand may be a flat panel, a leg, a gusset, etc., which may be pulled out of a back side of a display housing.

Figure 2:
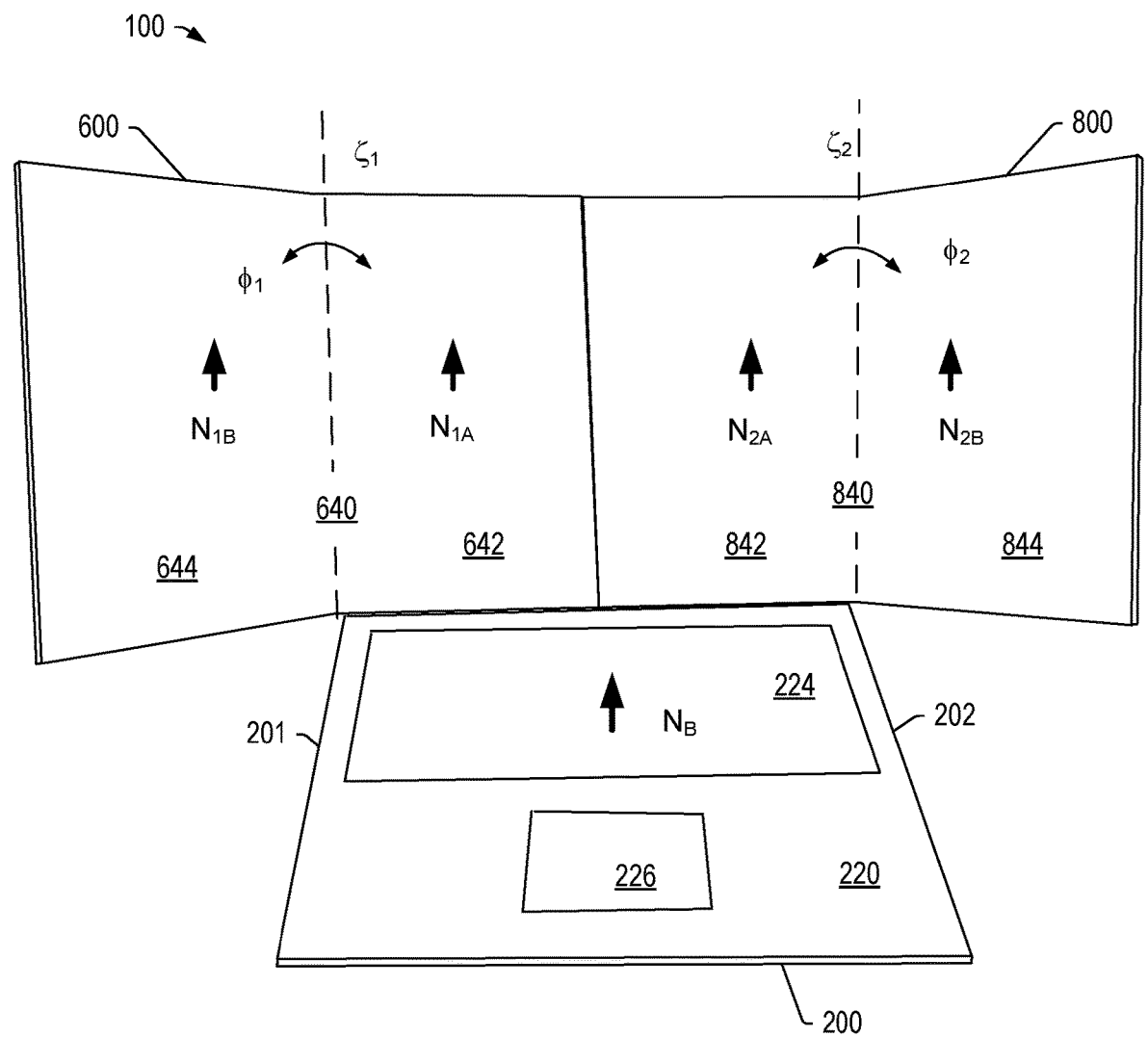
FIG. 2 is a perspective views of an example of a device.

FIG. 2 shows an example of the device 100 where the angles $\phi_1$ and $\phi_2$ are less than 180 degrees such that a more "surround" experience can be created.

Figure 3A:
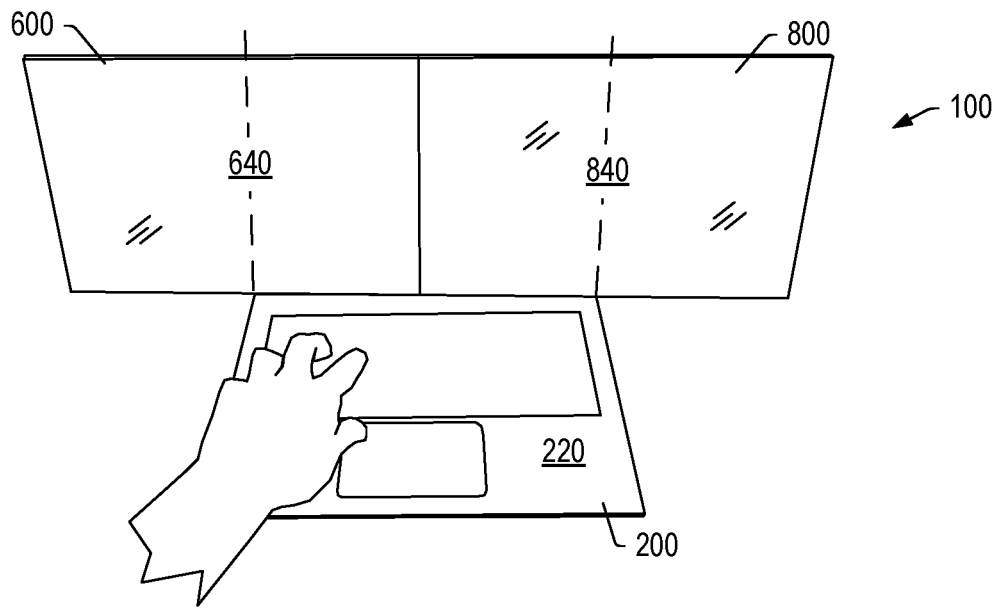
FIG. 3A and FIG. 3B are perspective views of an example of a device.
Figure 3B:
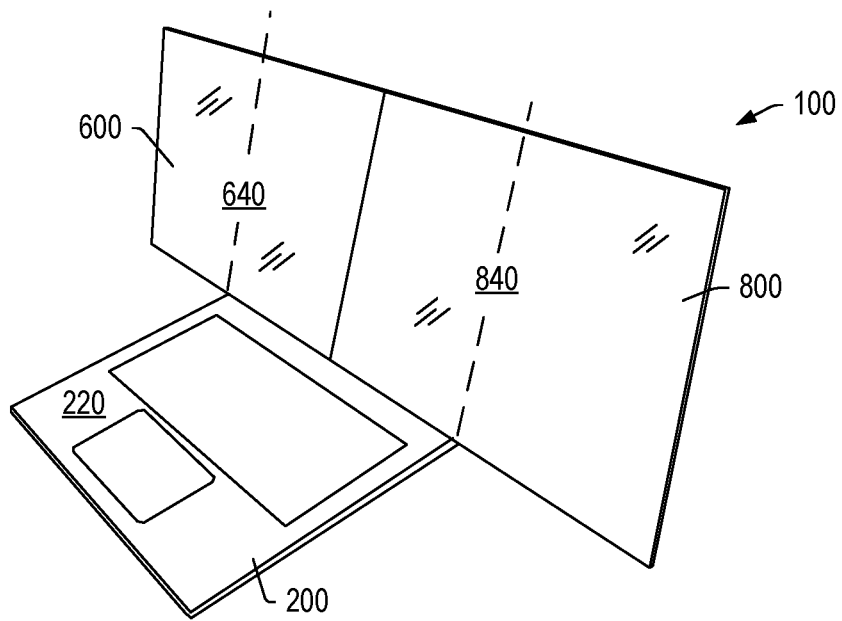

FIG. 3A and FIG. 3B show two perspective views of the device 100 as including the base housing 200 and the foldable display housings 600 and 800. As shown, the device 100 can have a display area that is approximately twice the area of the front surface 220 of the base housing 200.

Figure 4:
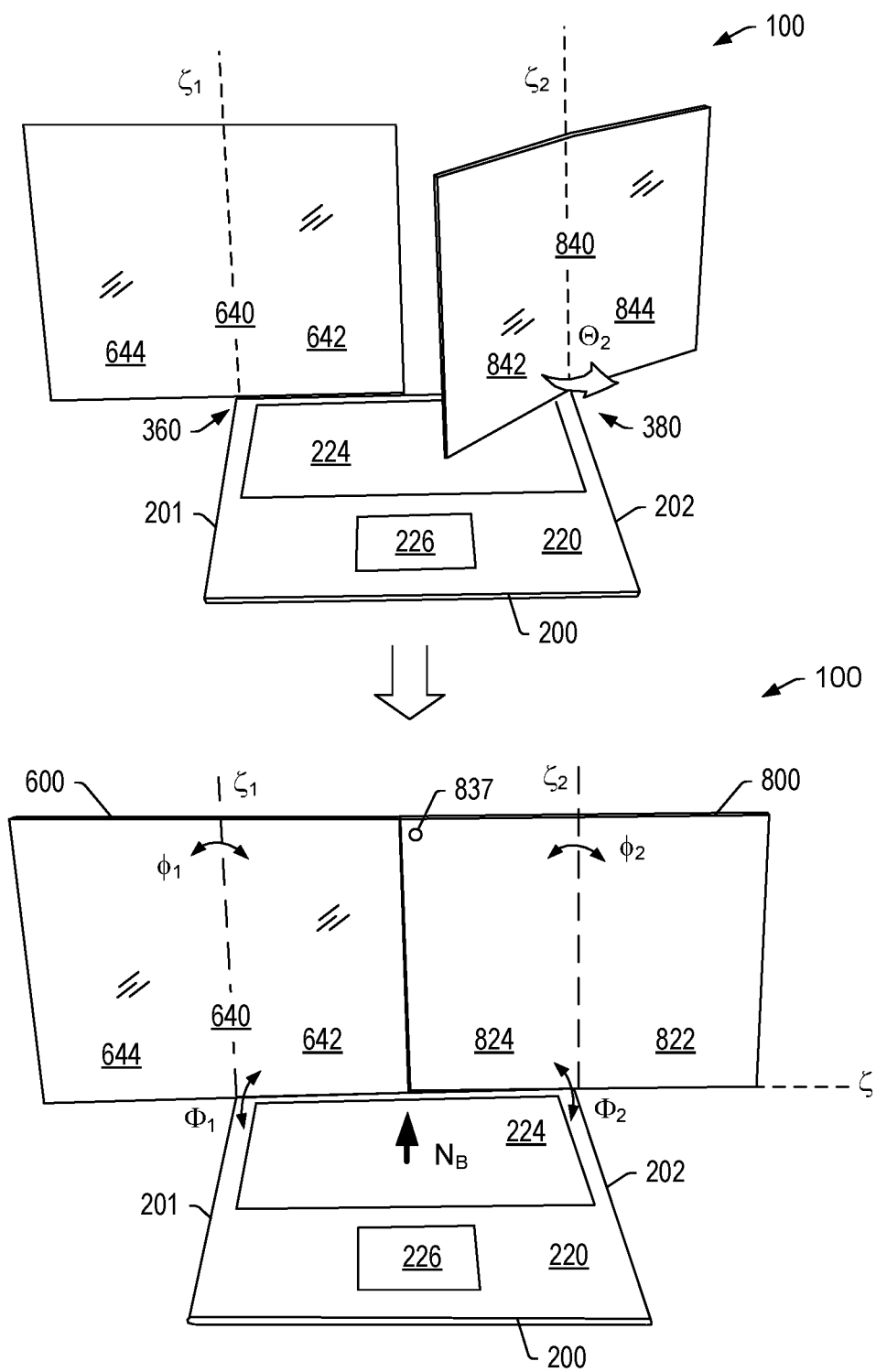
FIG. 4 is a series of views of an example of a device.

FIG. 4 shows an example of the device 100 where one or both of the foldable display housings 600 and 800 are rotatable such that one or both of the foldable displays 600 and 800 can be rotated to be facing away from the top surface 220 of the base housing 200. For example, consider the hinge assembly 380 as including features for rotation about the axis $\zeta$ and for rotation about the axis $\zeta_2$. As shown, the hinge assembly 380 provides for rotation about the axis by an angle $\Theta_2$, which may be up to 180 degrees or more (e.g., consider 360 degree rotation).

In the example of FIG. 4, the device 100 can be suitable for use from two sides. For example, consider the displays 640 and 840 as being touch screen displays that can be interacted with via a person on one side using the display 640 and via a person on another side using the display 840. In such an example, the device 100 may mirror the content rendered to the displays 640 and 840 such that both people see the same content. In such an approach, both displays 640 and 840 can include touch screen circuitry that is duplicated and converged such that touches to each of the displays 640 and 840 are merged such that interactions are visible on both displays 640 and 840.

In the example of FIG. 4, the foldable display housing 800 is shown as including a camera 837, which may be a video camera, a camera assembly, optionally with a microphone, etc. In such an example, the foldable display housing 600 may also include such a camera as a back side camera. As an example, a foldable display housing may include one or more cameras, one or more microphones, etc., which may be included as front side (e.g., display side) and/or back side components. As shown in the example of FIG. 4, the camera 837 is located substantially centrally with respect to the base housing 200. For example, the camera 837 may be located within approximately 10 percent of a center point as defined by a distance between the side edges 201 and 202 of the base housing 200. For example, if the distance is 30 centimeters, then the camera 837 may be within approximately 3 centimeters from the center point (e.g., a mid-point at 15 centimeters from either of the side edges 201 and 202).

As an example, the device 100 may automatically enter a mirror mode upon rotation of one of the foldable display housings 600 and 800 to face an opposite or other non-common direction. As an example, each of the foldable display housings 600 and 800 may be rotated by approximately 90 degrees such that each of the displays 640 and 680 face opposite directions. In such an example, the touchpad 226 may be accessible to from opposite sides, for example, to be interacted with by two users (e.g., a right hand of one user and a left hand of another user). In such an approach, the device 100 can provide for sharing content via the displays 640 and 680 and interacting with such content via the touchpad 226 as a shared touchpad; noting that the displays 640 and 680 may be touch screen displays and suitable for individual interactions by two users.

Figure 5:
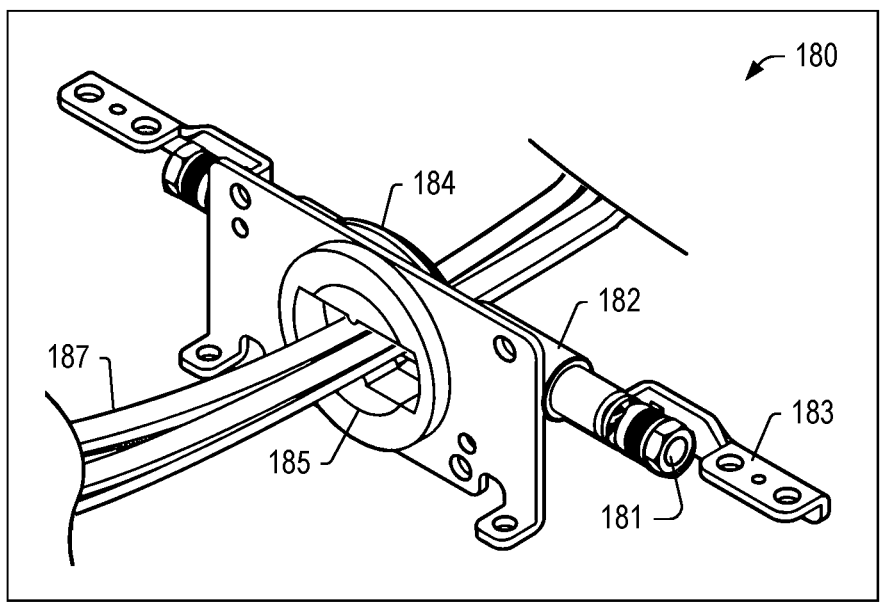
FIG. 5 is a series of views of examples of hinge assemblies.
Figure 5:
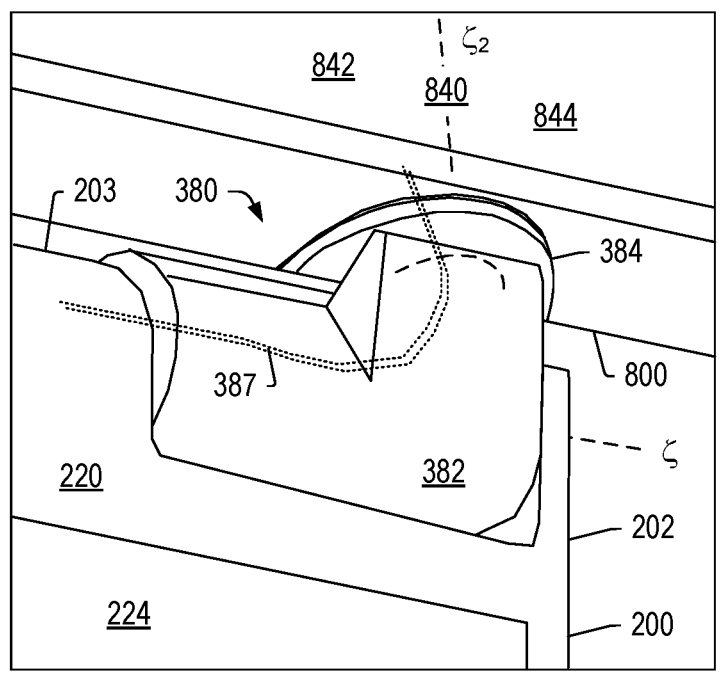

FIG. 5 shows examples of hinge assemblies 180 and 380. As shown, the hinge assembly 180 includes an axle 181 received at least in part by a barrel 182 where a leaf 183 is coupled to the axle 181. In such an example, various components such as washers, nuts, etc., may be fit to the axle 181 for purposes such as tensioning (e.g., friction), holding components in place, etc. As shown, the hinge assembly 180 also includes a turntable assembly 184 with a passage 185 for one or more wires 187. In such an example, the hinge assembly 180 includes two axes, one associated with the axle 181 and one associated with the turntable assembly 184.

In FIG. 5, the hinge assembly 380 is shown as including a barrel 382 and a turntable assembly 384 where the barrel 382 is rotatable about the axis $\zeta$ and where the turntable assembly 384 is rotatable about the axis $\zeta_2$. As shown, the hinge assembly 380 provides for rotation of the foldable display housing 800 with respect to the base housing 200. As shown, the hinge assembly 380 is positioned at or proximate to the side edge 202 of the base housing 200 (e.g., a right side edge) while allowing for rotation of the foldable display housing 800 at or approximately at the axis $\zeta_2$. As an example, the hinge assembly 380 may extend to the side edge 202 or slightly past the side edge 202. For example, the side edge 202 may not extend fully to the hinge edge 203 such that the hinge assembly 380 can provide for substantial alignment of the fold axis of the foldable display housing 800 with the side edge 202. As to substantial alignment, the hinge assembly 380 may provide for alignment of the fold axis of the foldable display housing 800 within approximately plus or minus 2 centimeters or less of the side edge 202; noting that the hinge assembly 380 may be translatable (see, e.g., FIG. 9).

In the example of FIG. 5, the hinge assembly 380 can support various movements and associated forces. For example, consider the hinge assembly 380 as providing support for folding the foldable display housing 800 with respect to the axis $\zeta_2$. As an example, the foldable display housing 800 can include a frame or other support member(s) that couple to the turntable assembly 384 to provide support for folding of the foldable display housing 800.

In the example of FIG. 5, one or more wires 387 are shown as electrically coupling circuitry of the base housing 200 and circuitry of the foldable display housing 800. As an example, the hinge assembly 360 can include features of the example hinge assembly 380 of FIG. 5. In such an approach, circuitry of the foldable display housings 600 and 800 can be electrically coupled to circuitry of the base housing 200 and, directly and/or indirectly, to circuitry of each other.

Figure 6:
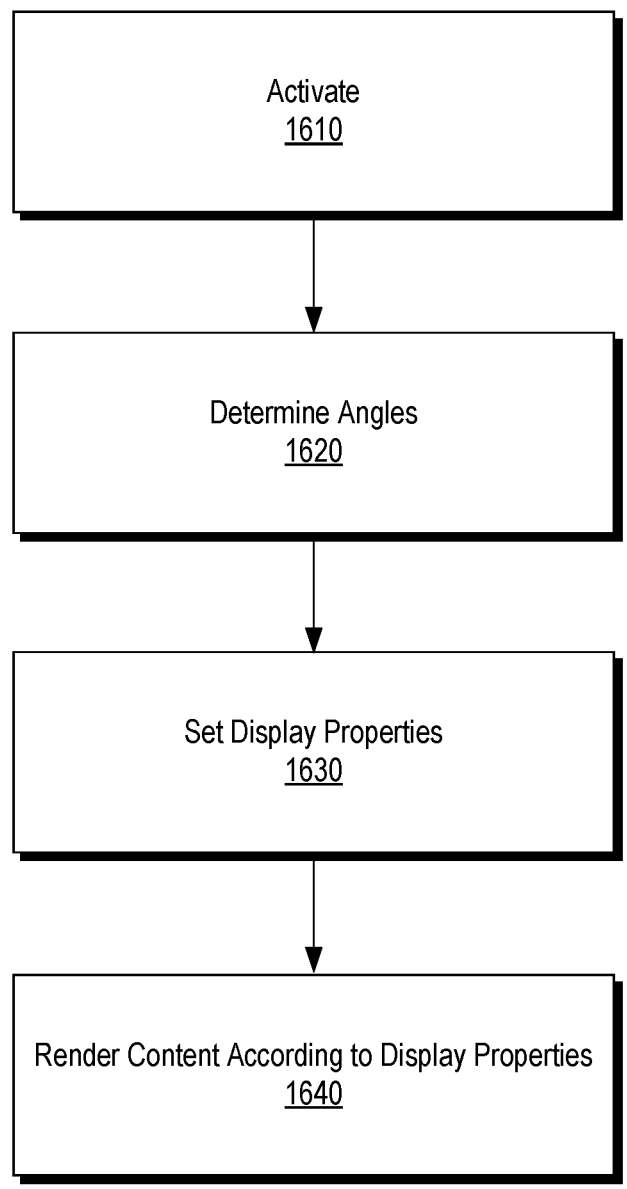
FIG. 6 is a block diagram of an example of a method.

FIG. 6 shows an example of a method 1600 that includes an activation block 1610 for activating a device such as the device 100, a determination block 1620 for determining angles of foldable display housings of the device, a set block 1630 for setting display properties of the device, and a render block 1640 for rendering content according to the set display properties of the device.

In the example of FIG. 6, the method 1600 can include determining angles of foldable display housings to determine whether displays of the foldable display housings are facing a common direction. In such an example, one or more circuits may be utilized. For example, consider each of the foldable display housings as include an accelerometer, a gyroscope, a gravity meter, etc., which can provide for independent sensing of movement and/or orientation.

As an example, one or more magnets and/or magnetic field sensors may be utilized, optionally in combination with one or more other sensors. In such an example, consider a Hall type sensor can detect presence and/or magnitude of a magnetic field using the Hall effect where an output voltage of such a sensor can be proportional to the strength of the field.

Figure 7:
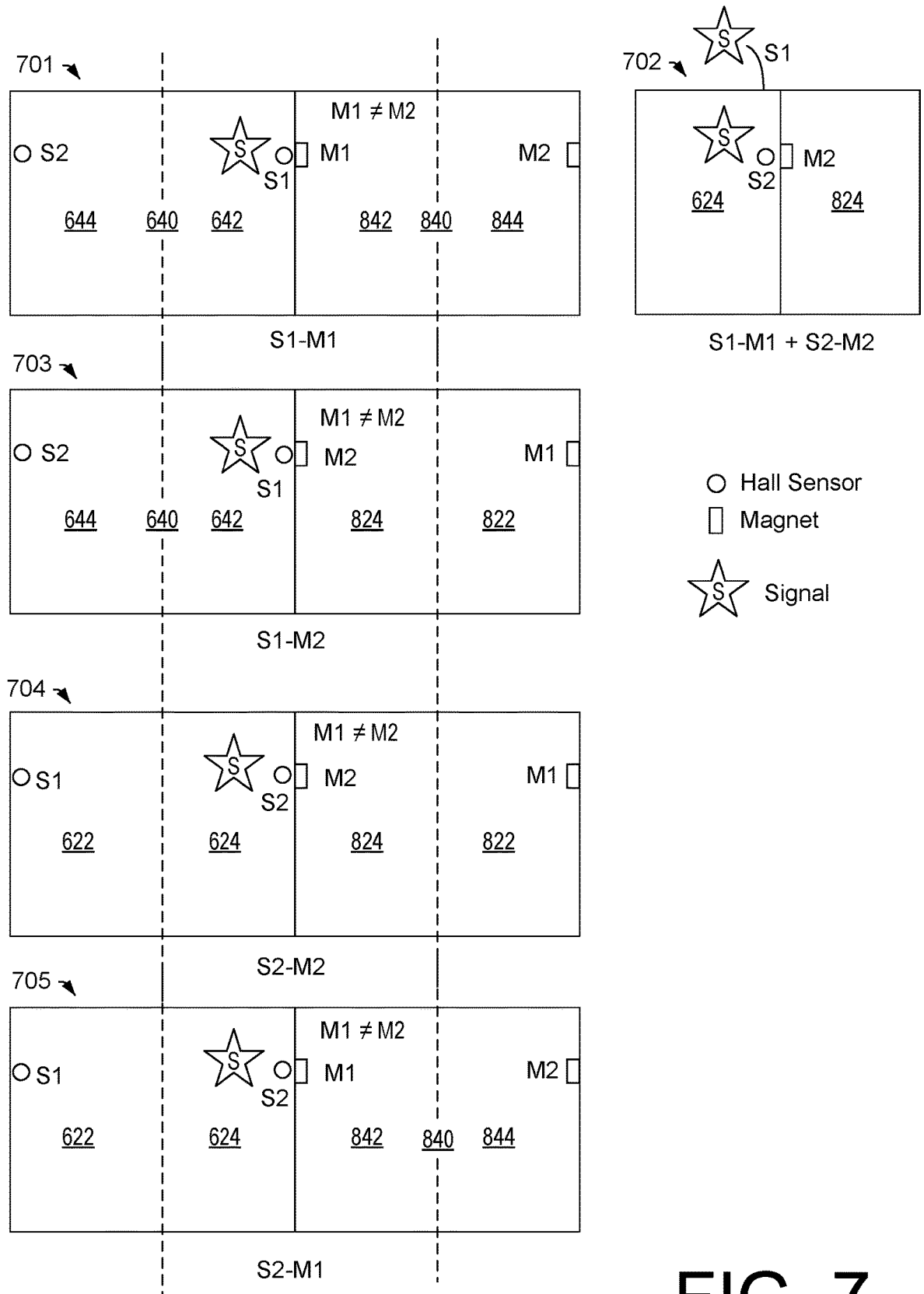
FIG. 7 is a series of diagrams of an example of a device.

FIG. 7 shows various examples of orientations 701, 702, 703, 704 and 705 with respect to two magnets M1 and M2 and two sensors S1 and S2 where the magnets M1 and M2 differ (e.g. with respect to field character, closeness to an edge, etc.). As shown, the arrangements of magnets and sensors can provide for detection of the various orientations. Thus, the device 100 can determine its orientation when closed (orientation 702), when open planar with both display portions 642 and 842 facing the same direction (orientation 701), with the display portion 642 facing one direction and the display portion 844 facing an opposite direction (orientation 703), with the display portions 644 and 844 facing the same direction (orientation 704) and with the display portions 644 and 842 facing opposite directions (orientation 705).

In the examples of FIG. 7, sensor and magnet pairing are indicated where, in the closed position (orientation 702), both sensors S1 and S2 can provide indications of edges of the foldable display housings being adjacent to each other. Upon opening to the orientation 701, the signal from sensor S1 remains while the signal from sensor S2 does not while a signal from the sensor S2 may occur again, though without a signal from the sensor S1 (see orientations 704 and 705). As shown, the magnets M1 and M2 differ such that the sensors S1 and S2 can distinguish whether an adjacent magnet is M1 or M2 (e.g., via amplitude of signal, etc.).

As shown in FIG. 7, one foldable display housing can include sensors while the other foldable display housing can include magnets; noting various other arrangements can be provided for purposes of logical states that correspond to the orientations illustrated in FIG. 7.

In the examples of FIG. 7, an edge can include a magnet (e.g., a permanent magnet) and/or a ferromagnetic material. For example, ferromagnetic material (e.g., including iron, etc.) can be included at a location of a Hall sensor of the foldable display housing 600 such that a magnetic attraction force is established with a magnet of the foldable display housing 800. In such an approach, alignment of edges of the two foldable display housings 600 and 800. As an example, a latch and a keeper may be included such that the foldable display housings 600 and 800 can be latched together. For example, one of the foldable display housings 600 and 800 can include a latch where the other one of the foldable display housings 600 and 800 includes a keeper that can receive a portion of the latch to physical couple the two foldable display housings 600 and 800 to each other. In such an example, a user may manually latch and unlatch the foldable display housings 600 and 800, for example, to allow for rotation of one or both of the foldable display housing 600 and 800 with respect to one another.

Where a physical and/or a magnetic latching mechanism is utilized, the foldable display housing 600 and 800 may be rotated with respect to the base housing 200 as a unit when the latching mechanism is engaged. For example, consider a user grasping a corner of the foldable display housing 600 and rotating it downward toward the base housing 200 such that via a latching mechanism the foldable display housing 800 also rotates downward toward the base housing 200. While downward rotation is mentioned, opening rotation may be accomplished in a similar manner where a latching mechanism is provided and engaged. Where no latching mechanism is provided or where a latching mechanism is disengaged, the foldable display housings 600 and 800 may be independently rotated with respect to the base housing

200. For example, a user may leave one of the foldable display housings 600 and 800 in a closed position with respect to the base housing 200 while rotating the other one of the foldable display housings 600 and 800 to an open position with respect to the base housing 200. As the fold axis of each of the foldable display housings 600 and 800 can be located at an outside edge, each of the foldable display housings 600 and 800 may be unfolded without interference. As an example, a foldable display may be activated and/or deactivated responsive to an orientation signal from one or more sensors. For example, consider activating on opening and deactivating on closing, noting that such responses may be user adjustable (e.g., according to settings stored in memory, etc.).

Figure 8:
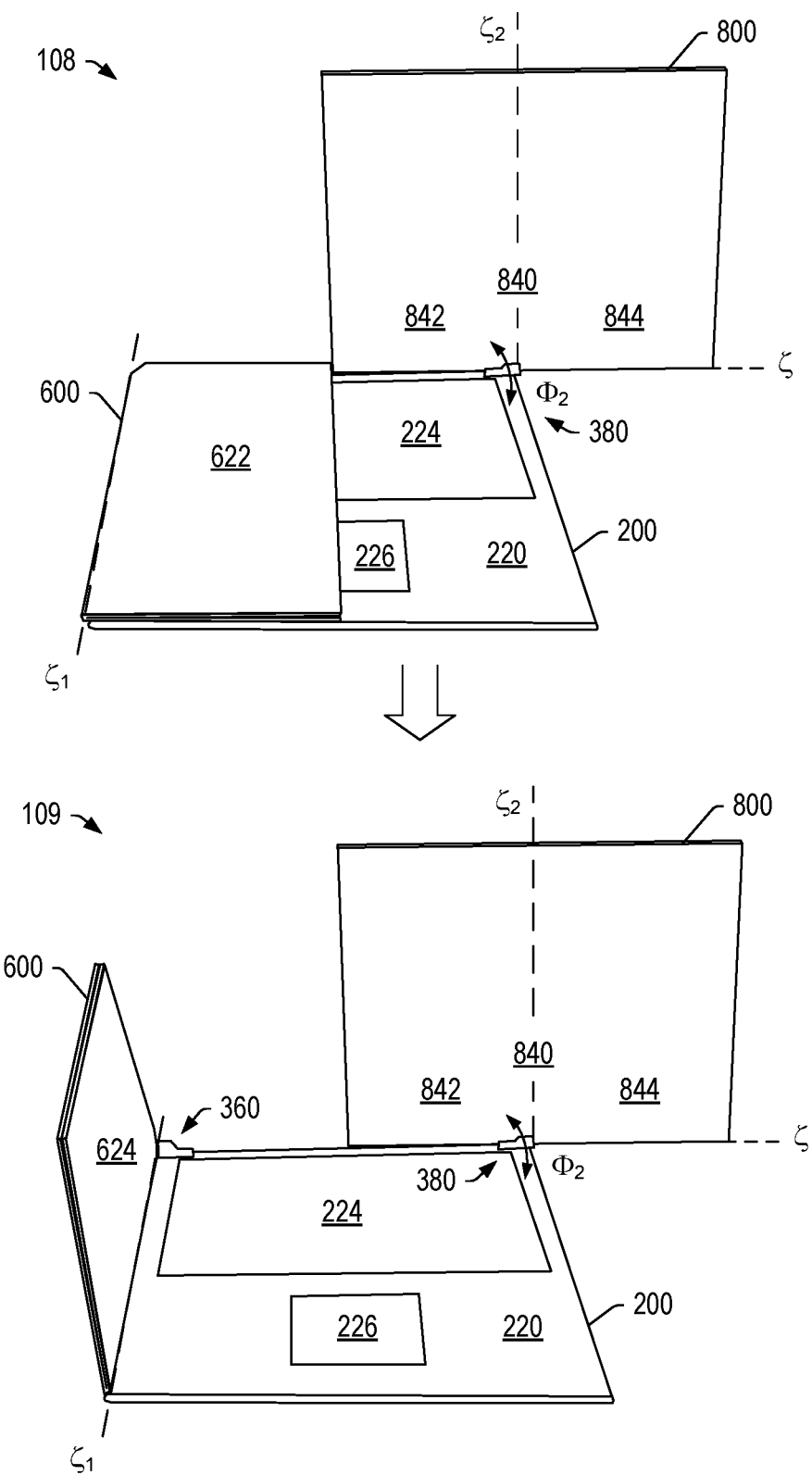
FIG. 8 is a series of views of an example of a device.

FIG. 8 shows example orientations 108 and 109 of the device 100 where, in the orientation 108, the foldable display housing 600 is closed with respect to the base housing 200 and where the foldable display housing 800 is open with respect to the base housing 200 and at least partially unfolded such that the display 840 is visible. In such an example, a portion of the keyboard 224 and/or a portion of the touchpad 226 may be exposed and operable for navigation, interactions, etc., with content rendered to the display 840. As shown in the orientation 109, the foldable display housing 600 may be rotated to expose the keyboard 224 fully and to expose the touchpad 226 fully.

Figure 9:
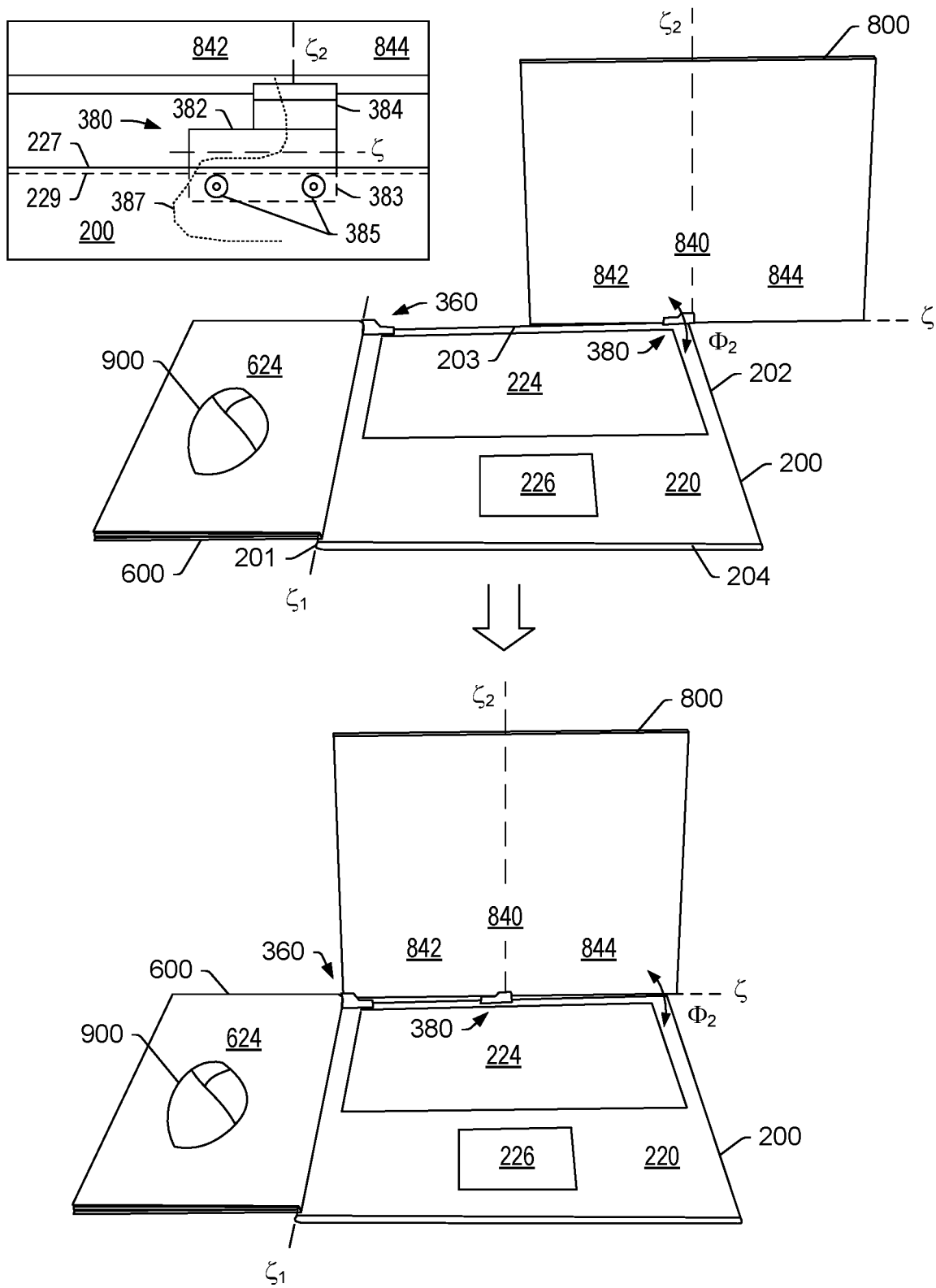
FIG. 9 is a series of views of an example of a device and an example of a translatable hinge assembly.

FIG. 9 shows an example of the device 100 along with a mouse 900 and an example of the hinge assembly 380 as a translatable hinge assembly. As shown, the foldable display housing 600 may be folded such that it is relatively flat and planar with respect to the base housing 200. In such an example, the back surface 624 of the foldable display housing 600 may be utilized to support the mouse 900 (e.g., as a mouse pad, etc.) and/or one or more other purposes (e.g., to hold papers, a phone, etc.). For example, consider a left handed user that wants to use the device 100 on his lap along with the mouse 900. In such an example, the left handed user can place the mouse 900 on the surface 624 while being able to use the display 840, the keyboard 224 and the touchpad 226. In such an example, the surface 624 can be a mouse pad surface, which may include a surface finish, surface indicia, etc., to facilitate use of a mouse. For example, consider the surface 624 as including a pattern that can enhance precision of an optical mouse. The 3M PRECISE mouse pad surface includes a pattern that enhances the precision of an optical mouse, particularly at fast speeds, which may also help to extends battery life of wireless mice (3M Company, Saint Paul, Minnesota).

While the example of FIG. 9 pertains to a left handed user, the device 100 can be similarly configured for a right handed user. Further, in the example of FIG. 9, the foldable display housing 800 may be partially folded, rotated and/or translated to provide a user with a more compact or ergonomic arrangement. For example, consider an arrangement for use on a plane whether on a user's lap or on a fold-down or fold-out table as can be commonly found in most commercial airplanes. As explained, the device 100 can include features, orientations, etc., that can provide for enhanced privacy (e.g., information security). For example, where the foldable display housing 800 in the example of FIG. 8 is rotated slightly and/or folded slightly, a user seated on a plane, a train, in a coffee shop, etc., may have lesser risk of others viewing content rendered to the display 840.

As an example, a device such as the device 100 can include circuitry that can independently control sleeping of each of the foldable displays 640 and 840, which may occur in an application dependent manner, optionally according to user settings. For example, one of the foldable displays 640 and 840 may sleep sooner than the other, which may depend on activity, content, application rendering to the foldable display, etc. For example, a word processing application may sleep sooner than an email application. In such an example, an application may automatically wake a display responsive to receipt of a communication or other signal. For example, if a display that renders information for an email application goes to sleep, it may wake upon receipt of an email communication. In such an approach, battery power may also be conserved for one or both of the foldable displays in a manner that depends on content, application type, user settings, etc.

As to the example of the hinge assembly 380, it is shown as including the barrel 382 and a turntable assembly 384 where the barrel 382 is rotatable about the axis $\zeta$ and where the turntable assembly 384 is rotatable about the axis $\zeta_2$. As shown, the hinge assembly 380 provides for rotation of the foldable display housing 800 with respect to the base housing 200. As shown in the example of FIG. 9, the hinge assembly 380 can be positioned at or proximate to the right side edge 202 of the base housing 200 and can be translatable to another position along the base housing 200, for example, consider translation to a center position such that the foldable display housing 800 is substantially aligned from side to side with the sides of the base housing 200.

As shown in the example of FIG. 9, the base housing 200 can include one or more slots 227 with one or more rails 229 where the hinge assembly 380 can include one or more extensions 383 with one or more wheels 385 that can be in contact with one or more of the one or more rails 229. In such an example, the hinge assembly 380 can be coupled to the base housing 200 via the one or more rails 229 and the one or more wheels 385, which may provide for some amount of compression/tension and/or frictional force such that the foldable display housing 800 can be maintained in a desired position with respect to the base housing 200 (e.g., consider force sufficient to overcome the force of gravity, etc., such that the foldable display housing 800 does not translate inadvertently). In the example of FIG. 9, the one or more wires 387 can, in part, travel with the hinge assembly 380 as it translates with respect to the base housing 200. For example, consider a ribbon type of cable as utilized for a traveling printer head of an inkjet printer. As an example, a rack and pinion type of translation mechanism may be included (e.g., a rack as a rail and a pinion as a wheel). As an example, gears may be utilized for translation mechanism, hinge assemblies, etc.

One or more types of translational mechanisms may be utilized for a translatable hinge assembly, which can include one or more rails (e.g., guide rails, etc.) and a component that can translate on the one or more rails. As an example, such a component may include a bore that receives a rail or bores that receive rails. While the example of FIG. 9 shows the hinge assembly 380 as being a translatable hinge assembly, the hinge assembly 360 may be translatable, additionally or alternatively. As an example, a translatable hinge assembly may be tracked such that its position can be determined by the device 100, which may provide for adjusting one or more settings, etc.

The examples of FIG. 8 and FIG. 9 show some orientations that can be achieved using particular hinge assemblies that can include features of one or more of the hinge assemblies 180 and 380 of FIG. 5.

As an example, the method 1600 of FIG. 6 may include determining angles, orientations, etc., per one or more sensors, one or more magnets, etc., for purposes of setting display properties and/or other properties. Referring to the orientation 701 of FIG. 7, the display properties may be set for the displays 640 and 680 to operate as two independent displays or for the displays 640 and 680 to operate as one continuous display. As to the orientation 703, the display properties may be set to be mirrored, which may correspond to a meeting or interview mode. As to the orientation 704, the display properties may be set for the displays 640 and 680 to operate as two independent displays or for the displays 640 and 680 to operate as one continuous display. As to the orientation 705, the display properties may be set to be mirrored, which may correspond to a meeting or interview mode. As an example, where no signal is generated, which may be for an orientation where edges are not adjacent, the display properties may be set such that the displays are independent or mirrored.

As an example, the device 100 can include one or more gaming modes. For example, consider a single gamer mode and a dual gamer mode. In a single gamer mode, display properties may be set to utilize both displays 640 and 840 for an expansive view for a single user; whereas, in a dual gamer mode, one of the displays 640 and 840 may be utilized for a first gamer perspective and the other one of the displays 640 and 840 may be utilized for a second gamer perspective. For example, consider a racing game where each gamer is driving a different vehicle. In such an example, one gamer may desire that the other gamer does not see her display and vice versa. In various orientations, the display 640 and the display 840 can be viewable from one respective side only such that someone on an opposite side cannot see what is rendered.

Referring to FIG. 1, an intermediate orientation between 104 and 106 may have the device 100 open but with the foldable display housings 600 and 800 folded such that the displays 640 and 840 are not visible. Or, for example, consider one of the foldable display housings 600 and 800 folded closed while the other is open. In such examples, a user may hide certain content rendered to the display 640 and/or the display 840. In such an approach, where one display is visible, it may have non-confidential, non-personal, etc., content rendered thereto, while the other non-visible display may have confidential, personal, etc., content rendered thereto. In such an approach, a user may periodically open the folded foldable display housing to quickly glimpse such content with reduced risk of someone else seeing it.

As an example, the device 100 may render sequential content to the displays 640 and 840. For example, consider a presentation where a first slide is rendered to the display 640 and a second slide is rendered to the display 840. In such an approach, a user can see two slides of the presentation at the same time, which may expedite viewing, review, etc., as the user does not have to toggle forward or backward with respect to the two slides. As an example, an electronic book can include content organized by pages where one or more pages may be rendered to the display 640 and one or more sequential pages may be rendered to the display 840. In such an approach, a user may see a number of pages and be able to scroll in a manner where a page disappears from the display 640 while a new page appears on the display 840 while an intermediate page shifts from being viewable on the display 840 to being viewable on the display 640.

As an example, the device 100 can utilize display properties where one of the displays 640 and 840 is dedicated to a first application or set of applications and where the other one of the displays 640 and 840 is dedicated to a second application or set of applications. In such an approach, the user can have one device (e.g., the device 100) with two separate displays where GUIs of applications can be rendered without having to worry about sizing as would be required to position those GUIs on a single display.

As an example, display settings can be adjusted to operate for a single application. For example, consider an email application where a list of emails appears on one display and open emails appear on another display. In set-ups where two separate monitors are utilized, such application control does not occur automatically but depends on user interaction. For example, in the OUTLOOK program, where two monitors are utilized, the two monitors can be considered to be both non-continuous and continuous such that maximizing a main email GUI fills one monitor while emails open in an area within a continuous space as last used, which may be on one monitor or the other or both. Hence, even where two monitors are connected to the same computer, they do not necessarily operate in a mode with total independence.

Figure 10:
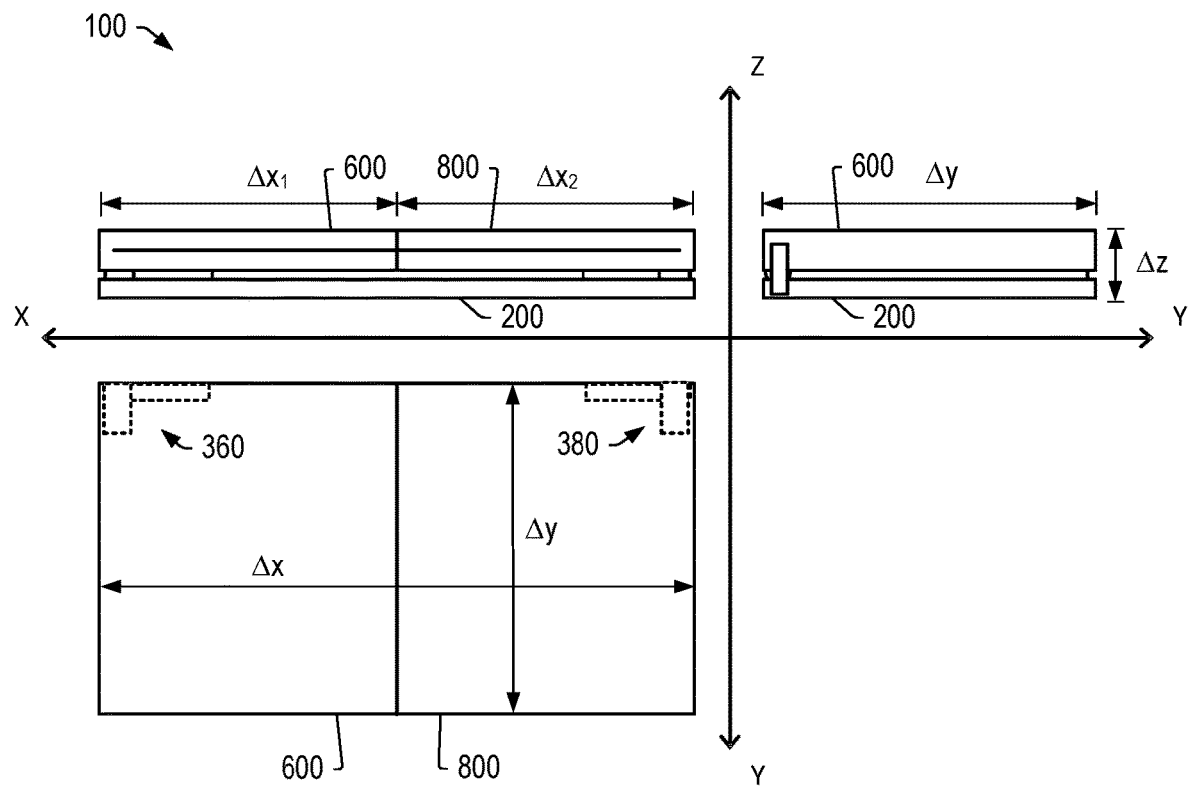
FIG. 10 is a series of plan views of an example of a device.

FIG. 10 shows various plan views of an example of the device 100 as including the base housing 200 and foldable display housings 600 and 800 where the hinge assembly 360 couples the foldable display housing 600 to the base housing 200 and where the hinge assembly 380 couples the foldable display housing 800 to the base housing 200.

Figure 11A:
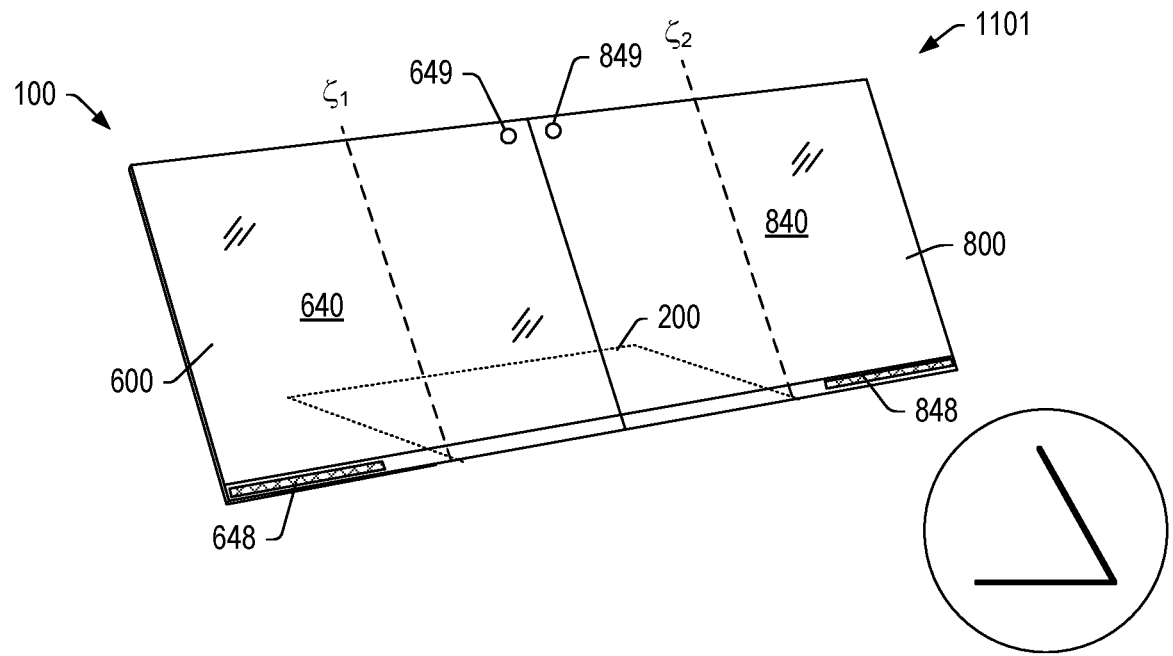
FIG. 11A and FIG. 11B are perspective views of an example of a device.
Figure 11B:
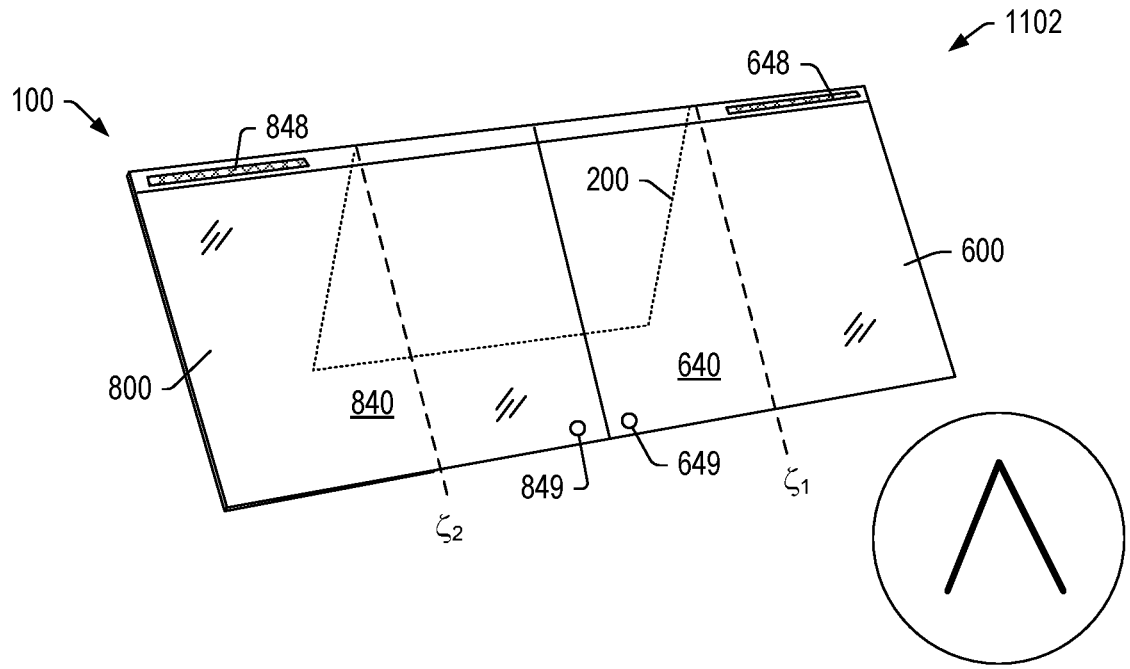

FIG. 11A and FIG. 11B show example orientations 1101 and 1102 of the system 100 where, in the orientation 1101, the base housing 200 (outlined via dotted lines) is behind the display surfaces 640 and 840 and supporting both of the foldable display housings 600 and 800 and where, in the orientation 1102, the base housing 200 forms a tent with the foldable display housings 600 and 800, noting that the display surfaces 640 and 840 are flipped by 180 degrees compared to the orientation 1101. The orientations 1101 and 1102 may be suitable for a wide-screen video experience, for example, where various human input device (HID) features of the base housing 200, if present, are not utilized.

As shown in FIG. 11A and FIG. 11B, the foldable display housing 600 can include a speaker 648 and a camera 649 and the foldable display housing 800 can include a speaker 848 and a camera 849 where the cameras 649 and 849 may be positioned proximate to a side or sides. For example, consider the cameras 649 and 849 as being positions proximate to inner and top sides such that they can be relatively close to each other in the orientations 1101 and 1102. In such an example, one or both of the cameras 649 and 849 may be operable, which may, for example, depend on an orientation that can be detected (see, e.g., FIG. 7, FIG. 9, etc.). As to the speakers 648 and 848, they may be positioned at a lower side of the foldable display housings 600 and 800 as shown in the orientation 1101, which may be flipped in the orientation 1102 such that the speakers 648 and 848 are at the top rather than at the bottom of the device 100 as oriented. As an example, the speakers 648 and 848 may be operable according to an orientation that can be detected (see, e.g., FIG. 7, FIG. 9, etc.).

As an example, various components may be operable in mono or stereo modes. For example, consider operation of the cameras 649 and 849 in a stereoscopic mode or in a monoscopic mode. Where the cameras 649 and 849 are facing a common direction, a stereoscopic mode may be utilized, which may record, transmit, etc., stereoscopic images (e.g., for multidimensional presentation, etc.). Where the cameras 649 and 849 are not facing a common direction, they may be utilized in a monoscopic mode where each of the cameras 649 and 849 captures monoscopic images. As an example, the speakers 648 and 848 may be operable in stereophonic or monophonic modes. For example, when facing a common direction, the speakers 648 and 848 can be operable in a stereophonic mode (e.g., as a left channel and a right speaker channel); whereas, when not facing a common direction (e.g., one facing back and one facing front, etc.), the speakers 648 and 848 may be operable in a monophonic mode.

As explained with respect to the method 1600 of FIG. 6, one or more settings may be determined responsive to detection of an orientation of the device 100. Such an approach may apply to display property settings, camera property settings, speaker property settings, microphone property settings, keyboard property settings, touchpad property settings, etc.

Figure 12:
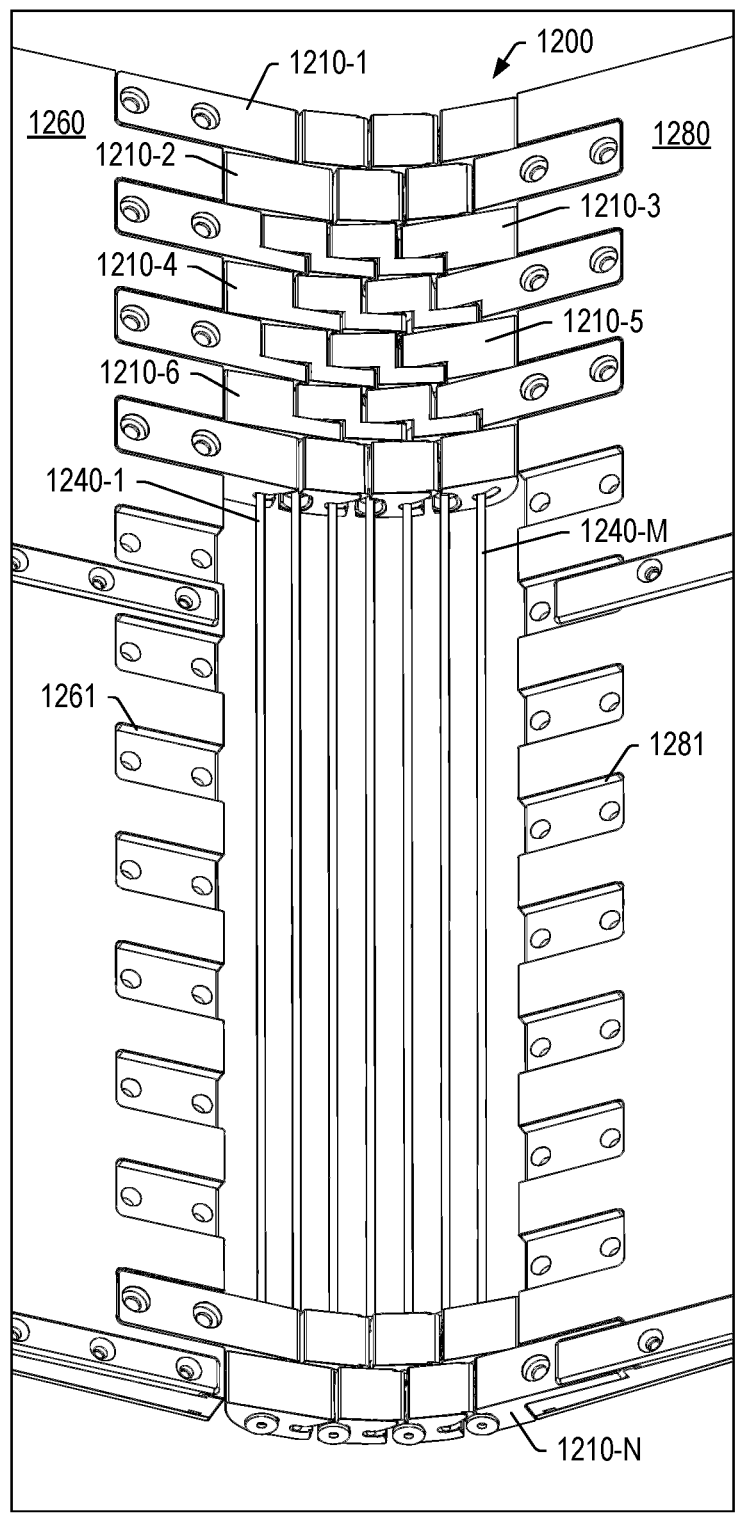
FIG. 12 is a perspective view of an example of a hinge assembly.

FIG. 12 shows a perspective view of an example of a hinge assembly 1200, which may be suitable for use as the hinge assembly 500 or the hinge assembly 700 of the device 100. In FIG. 12, the hinge assembly 1200 is shown as operatively coupling panels 1260 and 1280 (e.g., consider halves of a foldable display housing, etc.). In FIG. 12, various components and/or features can be present in multiples. As shown, the panels 1260 and 1280 can include recesses 1261 and 1281, respectively, to receive links of link assemblies 1210-1 to 1210-N. As shown, the hinge assembly 1200 can include rods 1240-1 to 1240-M, which are received by the link assemblies 1210-1 to 1210-N. In the example of FIG. 12, the number of link assemblies is twenty-four (e.g., N=24) and the number of rods is seven (e.g., M=7), noting that another number of link assemblies and/or another number of rods may be utilized.

In the example of FIG. 12, some of the link assemblies may be active link assemblies and some of the link assemblies may be dummy link assemblies. For example, an active link assembly can dictate movement while a dummy link assembly may be a spacer, act as a guide, etc. For example, in FIG. 12, the link assemblies 1210-1 and 1210-2 can be dummy link assemblies while the next four link assemblies 1210-3, 1210-4, 1210-5 and 1210-6 can be active link assemblies. As an example, a device can include two active link assemblies, four active link assemblies, 6 active link assemblies, etc. As an example, active link assemblies can be in pairs where one pair may be proximate to one side of a device and another pair may be proximate to another, opposing side of the device. In the example of FIG. 12, the hinge assembly may include eight active link assemblies (e.g., four proximate to one side and four proximate to another, opposing side). As an example, rods may extend from one side to another side or may be shorter. For example, consider one set of rods for one set of link assemblies and another set of rods for another set of link assemblies.

As an example, rods can include ends that may be threaded for coupling to bolts or other component such that rod tension can be adjustable where a higher tension may act to clamp various components of the hinge assembly 1200 in a manner that provides a desired amount of friction. For example, where washers are disposed between adjacent link assemblies, an increase in tension may provide for an increase in friction against surfaces of the washers. As an example, tension may be adjustable for purposes of ergonomics such that tension is tailored to user experience where a device can be positioned by a hand or hands of a user while being able to maintain the desired position without creeping movement, etc., which may be due to the influence of gravity. As an example, the hinge assembly 1200 may be characterized using one or more torques. In such an example, a gravity torque may be overcome through use of friction and/or one or more other techniques (e.g., mechanical stops, magnets for magnetic forces, etc.).

As to curvature, it can be defined as a value that measures how curved is a curve at a point on the curve. At any point P on a curve there is a circle of right size that touches P and fits the most (e.g., most-fitting circle an osculating circle). The flatter the curve at P, the larger is its osculating circle; whereas, the sharper the curve at P, the smaller is its osculating circle. The value of curvature can be defined as 1/r, where r is the radius of the osculating circle. When the osculating circle is large, the curve is flattish, and the curvature 1/r is small.

As an example, a hinge assembly may be structured with respect to a continuous, bendable display (e.g., the display 640 and/or the display 840) such that a bendable portion is to have relatively constant curvature. Such an approach may be provided for one or more purposes, which may provide for reducing stresses (e.g., compressive stresses and/or tensile stresses) of a continuous, bendable display, which may be, for example, a laminated structure (e.g., stacks of layers, etc.).

As an example, the device 100 can include the hinge assemblies 500 and 700 as including minimum and maximum radii of curvature, which may correspond to angles of approximately 0 degrees (e.g., or slightly less) and approximately 180 degrees (e.g., or less).

Figure 13A:
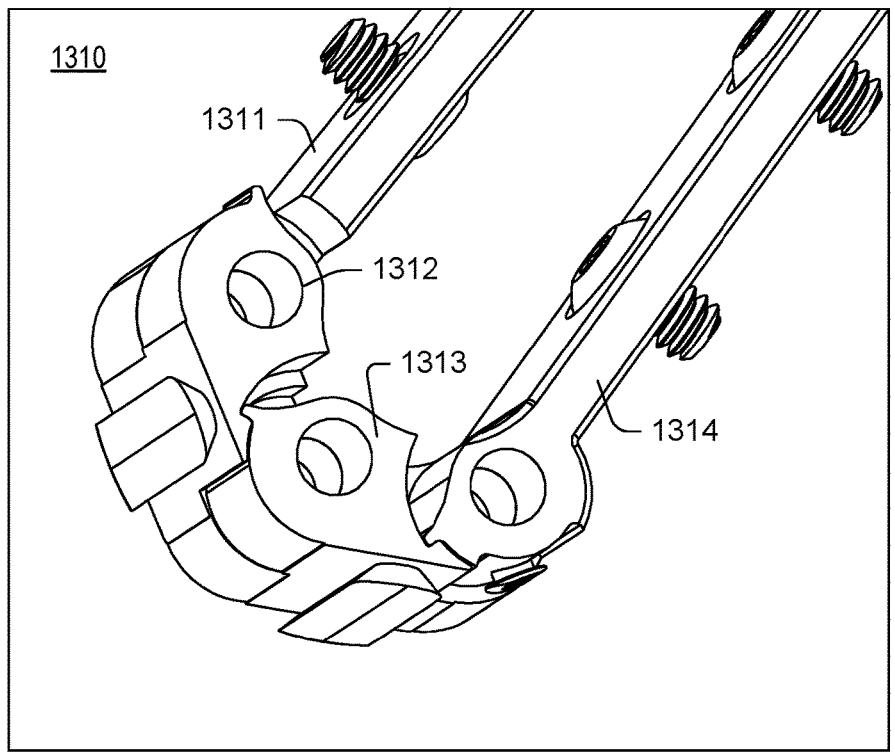
FIG. 13A, FIG. 13B and FIG. 13C show examples of hinge assemblies.
Figure 13B:
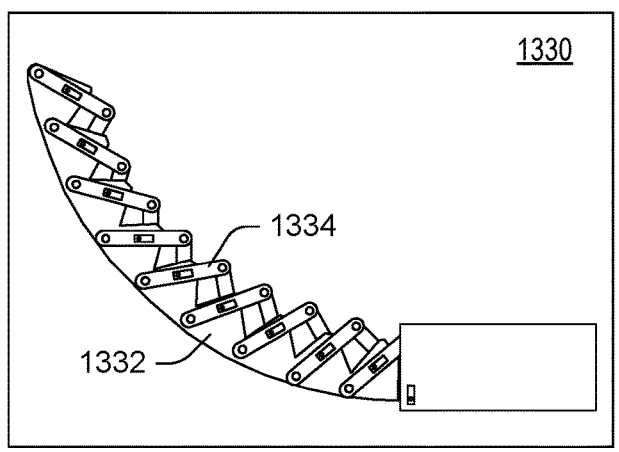
Figure 13C:
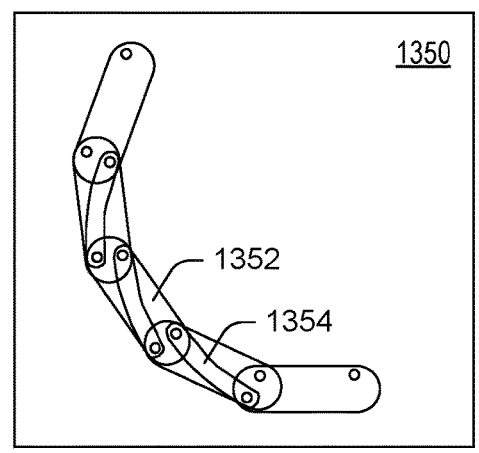

FIG. 13A, FIG. 13B and FIG. 13C show various examples of hinge assemblies 1310, 1330 and 1350, which may be utilized in a device such as the device 100, etc. For example, the foldable display housings 600 and 800 can include one or more of the hinge assemblies 1310, 1330 and 1350.

As shown, the hinge assembly 1310 includes links 1311, 1312, 1313 and 1314 where the links 1311 and 1314 are end links. The hinge assembly 1310 can be characterized by a radius of curvature.

As shown, the hinge assembly 1330 can include a flexible back bone 1332 that supports a scissoring assembly 1334.

As shown, the hinge assembly 1350 can include main links 1352 and guide links 1354 where the guide links 1354 control movement of the main links 1352.

As an example, a hinge assembly can provide a shape that is suitable for a bendable display when the hinge assembly is in a closed orientation.

As an example, a bendable display can be a flexible OLED technology display where a substrate can be polymeric such as, for example, polyimide. As an example, an overall thickness of a film stack of layers including OLEDs can be of the order of several millimeters or less. For example, consider layers such as a thin-film transitory (TFT) layer on a foldable substrate; an insulating layer covering the TFT; an OLED on the insulating layer; an encapsulation layer on the substrate; a flexible touch screen panel bonded to the encapsulation layer; and a hard coat cover window film that maintains the optical properties of a display film while providing some resistant to scratches, abrasions and impacts.

As an example, when bending a stack of layered films, there can be a location in the stack that may be a neutral axis, or neutral bending plane, where there can be effectively zero strain. As an example, a bendable display can include a display module that is located at or near the neutral plane to help reduce strains and stresses experienced by the display module. Where a layered bendable display is utilized, too much compressive stress on an inward bend can result in buckling and delamination, while excessive tensile stress can result in cracking and delamination. While each element in the display stack can bend to relatively tight radii (e.g., consider less than approximately 15 mm) as an independent thin film, when elements are bonded together with adhesion and then bent, mechanical stress can be transferred between the bonded elements, which may increase risk of delamination, buckling, etc., because of tensile force and/or compressive force present in the stack.

Referring to FIGS. 13A, 13B and 13C, various features may be utilized to define paths and curvatures. In the example hinge assembly 1310, various contact surfaces are shown that can define minimum and/or maximum positions. In the example hinge assembly 1330, stacked, asymmetric scissors can bend along a flexible backbone as they extend where such an approach may be tuned to different curvatures and where asymmetry can provide for bias of a neutral bending curve. In the example hinge assembly 1350, the guide links 1354 between non-adjacent main links 1352 can communicate relative motion of one pair of the main links 1352 to the next.

As an example, a hinge assembly can include pivots that are implemented as pins in slots, with a virtual pivot point that can be external to the hinge assembly and as close as possible to a neutral bending plane of a bendable display. In such an example, the surface of the hinge assembly adjacent to the bendable portion of the bendable display may maintain its effective length during articulation.

As explained, a device can include two foldable display housings, where each of the two foldable display housings can include a foldable (e.g., bendable) display. In such an example, one or more of the foldable display housings may be rotatable and/or translatable; noting that one or both may be fixed.

As explained, a device with two foldable display housings can be oriented for one or more particular tasks, which may include work tasks, gaming, watching movies, etc. As to work tasks, two displays can be utilized for two different applications (e.g., simultaneous tasks, etc.) or for different GUIs of the same application. As to gaming, a substantially continuous display may be provided where, for example, partially folding one or both foldable displays can create a more of a surround experience. As to watching movies or other video content, displays may provide a substantially continuous display experience, optionally where a base housing (e.g., a keyboard housing) is folded back behind foldable display housings (see, e.g., FIG. 11A and FIG. 11B). As explained, for relatively tight spaces, such as on a plane, in a vehicle, in a coffee shop, etc., a device with two foldable displays may be oriented in a relatively compact mode, optionally with one of the foldable displays serving as a support surface (e.g., for a mouse, a phone, etc.). As shown in the example of FIG. 1, the device 100 can be relatively compact in a closed clamshell orientation where both of the foldable display housings are folded closed. Such a device may provide for a relatively small or modest sized footprint while being able to open with a display area that is greater than the footprint.

As explained with respect to the example of FIG. 1, the device 100 can be compactable and expandable. In a compact state, the volume of the device 100 can be approximately the same as a notebook (e.g., laptop or clamshell) computing device. As explained, a footprint may be about the same as a notebook computing device with a thickness that may be slightly thicker due to the double thickness of the foldable display housings in a folded state. As an example, a base housing (e.g., a keyboard housing) may be provided with a thickness that is less than that of a thickness of a foldable display housing when it is folded closed. In a closed orientation of the device 100 of FIG. 1, a three layer stack can be formed rather than a two layer stack of a notebook computing device with a single display housing that closes and opens with respect to a single keyboard housing.

As an example, the device 100 can include a single graphics chip, whether separate from a CPU or integrated therein. In such an example, the single graphics chip may drive multiple displays such as two displays of two foldable display housings.

As explained, a device can include two foldable displays that meet along a mid-plane, where each of the foldable displays includes a foldable surface mechanism at its respective mid-plane. In such an approach, the foldable displays may be flexible OLED type of displays or another type of display. As explained with respect to the example of FIG. 1, each of the foldable display housings 600 and 800 can open and fold, for example, over a range of angles from approximately 0 degrees (e.g., closed) to approximately 180 degrees (e.g., fully open).

As mentioned, one or more mechanisms may provide for alignment of two foldable display housings. For example, latch mechanism, a magnetic mechanism, etc., may be utilized.

As an example, a device such as the device 100 may include one or more buttons for activating one of the displays 640 and 840, for activing both of the displays 640 and 840, etc. As an example, each of the displays 640 and 840 may operate independent of the other. As an example, the device 100 may include a power button for each of the displays 640 and 840 where one display may be physically turned off while the other is in use. In such an example, the device 100 may conserve power (e.g., battery power).

As an example, the device 100 can include native two display circuitry that can provide more options than a single display device. As explained, detection circuitry can be included that can detect orientation of foldable display housings with respect to each and set display properties appropriate for a detected orientation. In such an example, a device can include one or more settings that may be adjustable by a user via a GUI rendered to one or both of the displays. In such an example, the user may determine what settings are to be implemented for each of a plurality of different orientations. As mentioned, settings may include display, camera, application, microphone, speaker, etc., types of settings.

As to an example, a device such as the device 100 may be utilized for educational tasks. For example, consider practicing techniques using one display while watching content as to teaching of the techniques using the other display. In such an example, video may be rendered to one display while a user interacts with content on the other display.

As an example, a device such as the device 100 may be utilized when working with a team, for example, in videoconferencing, chatting, etc. As to programming tasks, displays may selectively render to one or more displays console output, client support with chatting and/or calling and database searching, etc. As to design tasks, consider one or more of CAD/CAE/CAM design where content on each display can be customized. As to music tasks, consider composing, audio mastering, etc., where content rendered to each display can differ. As to trading tasks, consider stock market information rendered to one display and a trading GUI rendered to the other display.

As explained, various multi-user scenarios may utilize a device such as the device 100 of FIG. 1. For example, where one or both of the foldable display housings are rotatable, one user may utilize one display and another user may utilize the other display. Such an approach may provide for utilization of two different applications by two different users simultaneously or, for example, utilization of a common application by two different users simultaneously. As mentioned, types of applications can include work type, game type, etc. Gaming application may include fast-paced interactive gaming applications, low-paced strategy gaming applications, online role-play gaming (RPG) applications, card gaming applications, etc.

As an example, a device can include a processor; memory accessible to the processor; a base housing; a first foldable display housing that comprises a first foldable display; a first hinge assembly that couples the first foldable display housing to the base housing; a second foldable display housing that comprises a second foldable display; and a second hinge assembly that couples the second foldable display housing to the base housing. In such an example, the processor can be operatively coupled to the first foldable display and the second foldable display for purposes of one or more of activation, de-activation, power states, rendering of content, etc.

As an example, a foldable display housing can be rotatable about two different axes of a hinge assembly. For example, consider an axis that is parallel to a hinge edge of a base housing and an axis that is substantially aligned with a side edge of the base housing. As an example, each of two foldable display housings of a device can be rotatable about two different axes of a respective hinge assembly.

As an example, a foldable display housing can be translatable with respect to a base housing. As an example, each of two foldable display housings of a device can be translatable with respect to a base housing.

As an example, a device can include at least one orientation sensor that generates a signal responsive to an edge of a first foldable display housing being adjacent to an edge of a second foldable display housing. In such an example, the device can include circuitry that sets properties for the first foldable display housing and the second foldable display housing responsive to the generated signal. For example, consider one or more of display properties, camera properties, speaker properties, microphone properties, etc. As an example, a device can include circuitry that sets display properties for a first foldable display and a second foldable display responsive to a generated signal.

As an example, a device can include at least one orientation sensor that is or includes a Hall sensor where at least one of a first foldable display housing and a second foldable display housing includes at least one magnet. In such an example, the Hall sensor can sense a magnetic field and generate a signal, which may have a signal amplitude that depends on a strength of the magnetic field.

As an example, a base housing can include a keyboard. As an example, a base housing can include a hinge edge, a front edge and opposing side edges. In such an example, a first foldable display housing can include a first fold axis, where a second foldable display housing includes a second fold axis and where the first fold axis and the second fold axis are substantially alignable with the opposing side edges of the base housing.

As an example, a first foldable display housing can be translatable via a first hinge assembly to substantially align a first fold axis centrally along a hinge edge of a base housing. In such an example, a second foldable display housing may be translatable via a second hinge assembly to substantially align a second fold axis centrally along the hinge edge of the base housing.

As an example, a back surface of a first display housing can be rotatable via a first hinge assembly to substantially align the back surface with a top surface of a base housing. In such an example, the back surface can be or can include a mouse pad surface. For example, consider a surface finish, a surface pattern, etc., that can facilitate use of a mouse such as an optical mouse.

As an example, a foldable display housing can include at least one camera. For example, consider a foldable display housing that includes a front facing camera and a back facing camera. As an example, a device can include two foldable display housings where each includes at least one camera. In such an example, each may include a front facing camera and a back facing camera. As explained, an orientation sensor may generate a signal where the signal can provide for setting one or more properties, which can include camera properties.

As an example, a device can include a first foldable display housing that includes a speaker and a second foldable display housing that includes a speaker. In such an example, the speakers can be operable in a monophonic mode and in a multiphonic mode (e.g., a stereophonic or multi-channel mode). As explained, an orientation sensor may generate a signal where the signal can provide for setting one or more properties, which can include speaker properties. As an example, such a signal may provide for setting properties for one or more components of one or two foldable display housings.

As an example, a device can include memory that can store logic for setting properties responsive to one or more orientation sensor signals. As explained with respect to FIG. 7, one or more sensors can be utilized as orientation sensors that can detect various orientations of a device that includes two foldable display housings. In such an example, a signal, signals, lack of a signal or lack of signals can provide indications as to orientation. As explained, a sensor may be a Hall sensor or another type of proximity sensor. As an example, a sensor may be an accelerometer, a gyroscope, etc. As an example, multiple types of sensors may be utilized in orientation detection. For example, in FIG. 11A and FIG. 11B, one or more sensors may be utilized to detect the orientation 1101 and the orientation 1102 where rendering of content to the foldable displays 640 and 840 can be in one direction for the orientation 1101 and in an opposite direction for the orientation 1102.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 14:
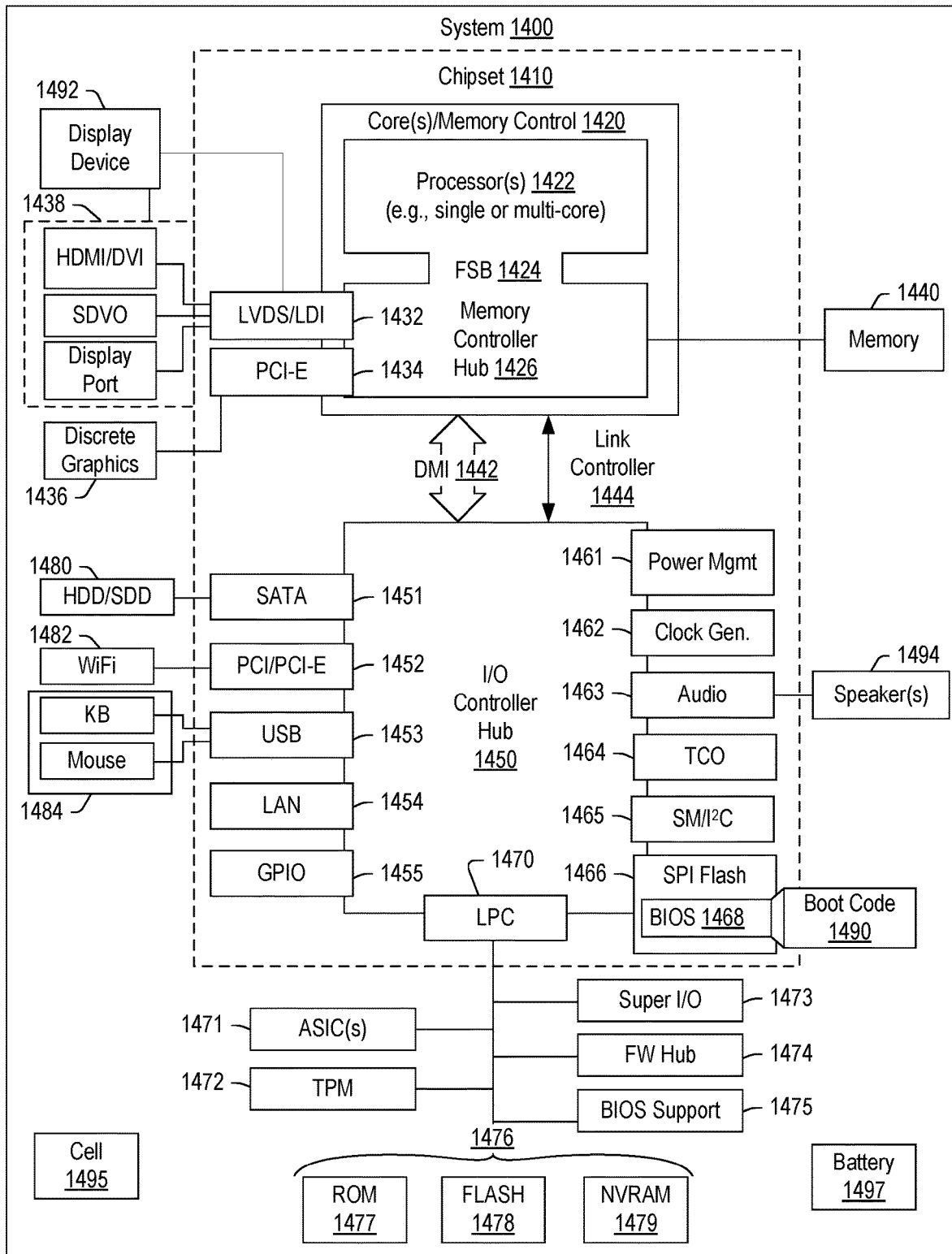
FIG. 14 is a diagram of an example of a system.

While various examples of circuits or circuitry have been discussed, FIG. 14 depicts a block diagram of an illustrative computer system 1400. The system 1400 may be or be part of a computing device or computing system, such as one of the THINKCENTRE® or THINKPAD® series of personal computers sold by Lenovo (US) Inc. of Morrisville, NC, or a workstation computer, such as the THINKSTATION®, as sold by Lenovo (US) Inc. of Morrisville, NC; however, as apparent from the description herein, a display device, a folding device, or other machine may include other features or only some of the features of the system 1400.

As an example, a monitor or display device may include features such as one or more of the features included in one of the LENOVO® IDEACENTRE® or THINKCENTRE® "all-in-one" (AIO) computing devices (e.g., sold by Lenovo (US) Inc. of Morrisville, NC). For example, the LENOVO® IDEACENTRE® A720 computing device includes an Intel® Core i7 processor, a 27 inch frameless multi-touch display (e.g., for HD resolution of 1920×1080 or more), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 14, the system 1400 includes a so-called chipset 1410. A chipset refers to a group of integrated circuits, or chips, that are designed to work together. Chipsets are usually marketed as a single product (e.g., consider chipsets marketed under the brands INTEL®, AMD®, etc.).

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture.

The memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory".

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported via the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O hub controller 1450 may include integrated gigabit Ethernet controller lines multiplexed with a PCI-E interface port. Other network features may operate independent of a PCI-E interface.

The interfaces of the I/O hub controller 1450 provide for communication with various devices, networks, etc. For example, the SATA interface 1451 provides for reading, writing or reading and writing information on one or more drives 1480 such as HDDs, SDDs or a combination thereof. The I/O hub controller 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, mice and various other devices (e.g., microphones, cameras, phones, storage, media players, etc.). On or more other types of sensors may optionally rely on the USB interface 1453 or another interface (e.g., I2C, etc.). As to microphones, the system 1400 of FIG. 14 may include hardware (e.g., audio card) appropriately configured for receipt of sound (e.g., user voice, ambient sound, music, other audio, etc.). As an example, the system 1400 can include an audio processor, which may be part of an audio card or may be integrated circuitry with one or more other components of the system 1400.

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468. Again, as described herein, a satellite, a base, a server or other machine may include fewer or more features than shown in the system 1400 of FIG. 14. Further, the system 1400 of FIG. 14 is shown as optionally include cell phone circuitry 1495, which may include GSM, CDMA, etc., types of circuitry configured for coordinated operation with one or more of the other features of the system 1400.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
   a processor;
   memory accessible to the processor;
   a base housing, wherein the base housing comprises a hinge edge, a front edge and opposing side edges;
   a first foldable display housing that comprises a first foldable display;
   a first hinge assembly that couples the first foldable display housing to the base housing;
   a second foldable display housing that comprises a second foldable display; and
   a second hinge assembly that couples the second foldable display housing to the base housing,
   wherein the first foldable display housing comprises a first fold axis, wherein the second foldable display housing comprises a second fold axis, wherein the first fold axis and the second fold axis are substantially alignable with the opposing side edges, and wherein the first foldable display housing is translatable via the first hinge assembly to substantially align the first fold axis centrally along the hinge edge of the base housing.

2. The device of claim 1, wherein the second foldable display housing is translatable via the second hinge assembly to substantially align the second fold axis centrally along the hinge edge of the base housing.

3. The device of claim 1, wherein the first foldable display housing is rotatable about two different axes of the first hinge assembly.

4. The device of claim 3, wherein the second foldable display housing is rotatable about two different axes of the second hinge assembly.

5. The device of claim 1, wherein the second foldable display housing is translatable with respect to the base housing.

6. The device of claim 1, comprising at least one orientation sensor that generates a signal responsive to an edge of the first foldable display housing being adjacent to an edge of the second foldable display housing.

7. The device of claim 6, comprising circuitry that sets properties for the first foldable display housing and the second foldable display housing responsive to the generated signal.

8. The device of claim 6, comprising circuitry that sets display properties for the first foldable display and the second foldable display responsive to the generated signal.

9. The device of claim 6, wherein the at least one orientation sensor comprises a Hall sensor and wherein at least one of the first foldable display housing and the second foldable display housing comprises at least one magnet.

10. The device of claim 1, wherein the base housing comprises a keyboard.

11. The device of claim 1, wherein a back surface of the first display housing is rotatable via the first hinge assembly to substantially align the back surface with a top surface of the base housing.

12. The device of claim 1, wherein the first foldable display housing comprises at least one camera.

13. The device of claim 12, wherein the first foldable display housing comprises a front facing camera and a back facing camera.

14. The device of claim 1, wherein the first foldable display housing comprises a speaker and wherein the second foldable display housing comprises a speaker.

15. The device of claim 14, wherein the speakers are operable in a monophonic mode and in a multiphonic mode.

16. A device comprising:
   a processor;
   memory accessible to the processor;
   a base housing;
   a first foldable display housing that comprises a first foldable display;
   a first hinge assembly that couples the first foldable display housing to the base housing;
   a second foldable display housing that comprises a second foldable display; and
   a second hinge assembly that couples the second foldable display housing to the base housing,
   wherein a back surface of the first display housing is rotatable via the first hinge assembly to substantially align the back surface with a top surface of the base housing, and wherein the back surface comprises one or more of a mouse pad surface finish and a mouse pad surface pattern to facilitate use of an optical mouse.

* * * * *